United States Patent
Kimura

(10) Patent No.: US 9,792,494 B2
(45) Date of Patent: Oct. 17, 2017

(54) IMAGE PROCESSING APPARATUS, METHOD, AND PROGRAM CAPABLE OF RECOGNIZING HAND GESTURES

(75) Inventor: Jun Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 13/282,044

(22) Filed: Oct. 26, 2011

(65) Prior Publication Data

US 2012/0114255 A1    May 10, 2012

(30) Foreign Application Priority Data

Nov. 4, 2010  (JP) ................................ P2010-247284

(51) Int. Cl.
   *G06K 9/00*   (2006.01)
   *G06F 3/01*   (2006.01)

(52) U.S. Cl.
   CPC ......... *G06K 9/00389* (2013.01); *G06F 3/017* (2013.01); *G06K 9/00221* (2013.01); *G06K 9/00228* (2013.01); *G06K 9/00335* (2013.01); *G06K 9/00355* (2013.01); *G06K 9/00362* (2013.01)

(58) Field of Classification Search
   CPC ........... G06K 9/00382; G06K 9/00389; G06K 9/00221; G06K 9/00228; G06K 9/00335; G06K 9/00355; G06K 9/00362; G06K 9/00375; G06K 9/00536; G06K 9/6201; G06F 3/011; G06F 3/014; G06F 3/017
   USPC ....... 382/100, 103, 115, 118, 173, 181, 203, 382/209, 217, 218, 224, 282, 291
   See application file for complete search history.

(56) References Cited

U.S. PATENT DOCUMENTS 6,256,400 B1 *  7/2001  Takata ............... G06K 9/00335
                                                        382/103
6,819,782 B1 * 11/2004  Imagawa et al. ............. 382/115
                        (Continued)

FOREIGN PATENT DOCUMENTS

JP           9-206471         8/1997
JP        2007-333690        12/2007
                (Continued)

OTHER PUBLICATIONS

Brice Michoud, Erwan Guillou, Hector Briceño and Saïda Bouakaz, "Real-Time Marker-free Motion Capture from multiple cameras", IEEE, 11th International Conference on Computer Vision, Oct. 2007, pp. 1-7.*

*Primary Examiner* — Eric Rush
(74) *Attorney, Agent, or Firm* — Paratus Law Group, PLLC

(57) ABSTRACT

An image processing apparatus includes a facial image detection unit which detects a facial image from an input image; a posture estimation unit which estimates a posture of a person in the input image from a position of the facial image; a hand position detection unit which detects positions of hands of the person based on the posture; a hand image extraction unit which extracts a hand image of the person from the input image based on information regarding the positions of the hands of the person; a hand shape specifying unit which specifies shapes of the hands of the person based on the hand image; a hand shape time-series storage unit which stores the shapes of the hands in a time-series; and a hand gesture recognition unit which recognizes a hand gesture based on information regarding the shapes of the hands.

18 Claims, 9 Drawing Sheets

(56) References Cited

U.S. PATENT DOCUMENTS

| | | | |
|---|---|---|---|
| 7,180,500 B2* | 2/2007 | Marvit et al. | 345/156 |
| 7,308,112 B2 | 12/2007 | Fujimura et al. | |
| 2002/0064382 A1* | 5/2002 | Hildreth | G06K 9/00375 |
| | | | 348/169 |
| 2003/0156756 A1* | 8/2003 | Gokturk et al. | 382/190 |
| 2004/0001113 A1* | 1/2004 | Zipperer et al. | 345/853 |
| 2004/0028260 A1* | 2/2004 | Higaki et al. | 382/118 |
| 2004/0190776 A1* | 9/2004 | Higaki et al. | 382/190 |
| 2005/0271279 A1* | 12/2005 | Fujimura et al. | 382/203 |
| 2007/0283296 A1* | 12/2007 | Nilsson | 715/863 |
| 2008/0018595 A1* | 1/2008 | Hildreth et al. | 382/154 |
| 2008/0112592 A1 | 5/2008 | Wu et al. | |
| 2008/0192005 A1* | 8/2008 | Elgoyhen | G06F 3/017 |
| | | | 345/158 |
| 2010/0083373 A1* | 4/2010 | White et al. | 726/21 |
| 2010/0211918 A1* | 8/2010 | Liang | G06K 9/00335 |
| | | | 382/103 |
| 2011/0026765 A1* | 2/2011 | Ivanich et al. | 382/103 |
| 2011/0037731 A1* | 2/2011 | Wang et al. | 345/175 |

FOREIGN PATENT DOCUMENTS

| | | |
|---|---|---|
| JP | 2007-538318 | 12/2007 |
| WO | WO 2009157633 A1 * | 12/2009 |

* cited by examiner

FIG. 8
A
B
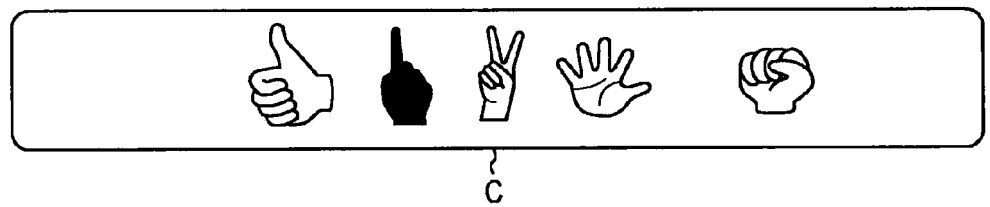
C
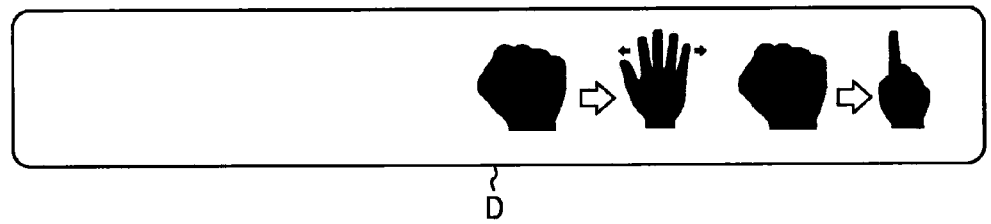
D

IMAGE PROCESSING APPARATUS, METHOD, AND PROGRAM CAPABLE OF RECOGNIZING HAND GESTURES

BACKGROUND

The present disclosure relates to an image processing apparatus, method, and program, and more particularly, to an image processing apparatus, method, and program capable of recognizing a hand gesture rapidly and accurately.

Techniques for recognizing hand gestures by a person as a hand gesture through an image have generally come into widespread use.

In the techniques for recognizing hand gestures, first, an image including only imaged hands is used, or an image including only the hands is extracted by designating the positions of the hands in the image.

Then, the hand gesture is recognized from an image, in which only hands are extracted, using flesh-color information, motion detection, and a pattern matching method (see Japanese Unexamined Patent Application Publication No. 2007-333690, Japanese Unexamined Patent Application Publication No. 2007-538318, and Japanese Unexamined Patent Application Publication No. 9-206471).

SUMMARY

In Japanese Unexamined Patent Application Publication No. 2007-333690, Japanese Unexamined Patent Application Publication No. 2007-538318, and Japanese Unexamined Patent Application Publication No. 9-206471, a hand gesture may not be recognized from an image including an entire human body, since it is assumed in advance that an image including only the hands is used.

It takes some time to detect a region including only the hands from the image including an entire human body. Even when the region including only the hands is extracted based on information regarding the rough positions of the hands, an image of the extracted region including only the hands is just also rough. Therefore, it is necessary to recognize the hand gesture in a state where the hand gesture may not necessarily be recognized from the image of the region including only the hands. For this reason, the robustness of the recognition result may not necessarily be high.

It is desirable to provide a technique capable of recognizing a hand gesture rapidly and accurately using an image including an entire human body.

According to an embodiment of the disclosure, there is provided an image processing apparatus including a facial image detection unit which detects a facial image from an input image; a posture estimation unit which estimates a posture of a person in the input image from a position of the facial image detected by the facial image detection unit; a hand position detection unit which detects positions of hands of the person based on the posture estimated by the posture estimation unit; a hand image extraction unit which extracts a hand image of the person from the input image based on information regarding the positions of the hands of the person detected by the hand position detection unit; a hand shape specifying unit which specifies shapes of the hands of the person based on the hand image extracted by the hand image extraction unit; a hand shape time-series storage unit which stores the shapes of the hands specified by the hand shape specifying unit in a time-series by corresponding to the information regarding the positions of the hands; and a hand gesture recognition unit which recognizes a hand gesture, which is a gesture using the hands of the person, based on information regarding the shapes of the hands stored in the time-series in the hand shape time-series storage unit by corresponding to the information regarding the positions of the hands.

The image processing apparatus may further include a hand gesture storage unit which stores the information regarding the shapes of the hands in a time-series by corresponding to the information regarding the positions of the hands for each type of hand gesture. The hand gesture recognition unit may compare the information regarding the shapes of the hands stored in the time-series in the hand shape time-series storage unit by corresponding to the information regarding the positions of the hands, to the information regarding the shapes of the hands stored in the time-series in the hand gesture storage unit by corresponding to the information regarding the positions of the hands for each hand gesture, and then may recognize the hand gesture based on the comparison result.

The image processing apparatus may further include a similarity calculation unit which calculates similarity between the information regarding the shapes of the hands stored in the time-series in the hand shape time-series storage unit by corresponding to the information regarding the positions of the hands and the information regarding the shapes of the hands stored in the time-series in the hand gesture storage unit by corresponding to the information regarding the positions of the hands for each hand gesture. The hand gesture recognition unit may set the hand gesture with the highest similarity as a recognition result.

The hand gesture recognition unit may consider that the hand gesture, as the recognition result, is not present, when the highest similarity is less than a predetermined threshold value.

The image processing apparatus may further include a registration unit which registers the information regarding the shapes of the hands stored in the time-series in the hand shape time-series storage unit by corresponding to the information regarding the positions of the hands, in the hand gesture storage unit by corresponding to a predetermined hand gesture, when the highest similarity is less than the predetermined threshold value.

According to another embodiment of the disclosure, there is provided an image processing method of an image processing apparatus including a facial image detection unit which detects a facial image from an input image, a posture estimation unit which estimates a posture of a person in the input image from a position of the facial image detected by the facial image detection unit, a hand position detection unit which detects positions of hands of the person based on the posture estimated by the posture estimation unit, a hand image extraction unit which extracts a hand image of the person from the input image based on information regarding the positions of the hands of the person detected by the hand position detection unit, a hand shape specifying unit which specifies shapes of the hands of the person based on the hand image extracted by the hand image extraction unit, a hand shape time-series storage unit which stores the shapes of the hands specified by the hand shape specifying unit in a time-series by corresponding to the information regarding the positions of the hands, and a hand gesture recognition unit which recognizes a hand gesture, which is a gesture using the hands of the person, based on information regarding the shapes of the hands stored in the time-series in the hand shape time-series storage unit by corresponding to the information regarding the positions of the hands. The image processing method includes: detecting, by the facial image detection unit, the facial image from the input image; estimating, by the posture estimation unit, the posture of the person in the input image from the position of the facial image detected in the detecting of the facial image; detecting, by the hand position detection unit, the positions of the hands of the person based on the posture estimated in the estimating of the posture of the person; extracting, by the hand image extraction unit, the hand image of the person from the input image based on the information regarding the positions of the hands of the person detected in the detecting of the hand positions of the hands; specifying, by the hand shape specifying unit, the shapes of the hands of the person based on the hand image extracted in the extracting of the hand image; storing, by the hand shape time-series storage unit, the shapes of the hands specified in the specifying of the shapes of the hands in the time-series by corresponding to the information regarding the positions of the hands; and recognizing, by the hand gesture recognition unit, the hand gesture, which is a gesture using the hands of the person, based on the information regarding the shapes of the hands stored in the time-series in the storing of the shapes of the hands by corresponding to the information regarding the positions of the hands.

According to still another embodiment, there is provided a program causing a computer, which controls an image processing apparatus including a facial image detection unit which detects a facial image from an input image, a posture estimation unit which estimates a posture of a person in the input image from a position of the facial image detected by the facial image detection unit, a hand position detection unit which detects positions of hands of the person based on the posture estimated by the posture estimation unit, a hand image extraction unit which extracts a hand image of the person from the input image based on information regarding the positions of the hands of the person detected by the hand position detection unit, a hand shape specifying unit which specifies shapes of the hands of the person based on the hand image extracted by the hand image extraction unit, a hand shape time-series storage unit which stores the shapes of the hands specified by the hand shape specifying unit in a time-series by corresponding to the information regarding the positions of the hands, and a hand gesture recognition unit which recognizes a hand gesture, which is a gesture using the hands of the person, based on information regarding the shapes of the hands stored in the time-series in the hand shape time-series storage unit by corresponding to the information regarding the positions of the hands, to execute detecting, by the facial image detection unit, the facial image from the input image, estimating, by the posture estimation unit, the posture of the person in the input image from the position of the facial image detected in the detecting of the facial image, detecting, by the hand position detection unit, the positions of the hands of the person based on the posture estimated in the estimating of the posture of the person, extracting, by the hand image extraction unit, the hand image of the person from the input image based on the information regarding the positions of the hands of the person detected in the detecting of the hand positions of the hands, specifying, by the hand shape specifying unit, the shapes of the hands of the person based on the hand image extracted in the extracting of the hand image, storing, by the hand shape time-series storage unit, the shapes of the hands specified in the specifying of the shapes of the hands in the time-series by corresponding to the information regarding the positions of the hands, and recognizing, by the hand gesture recognition unit, the hand gesture, which is a gesture using the hands of the person, based on the information regarding the shapes of the hands stored in the time-series in the storing of the shapes of the hands by corresponding to the information regarding the positions of the hands.

According to the embodiment of the disclosure, the facial image from the input image is detected; the posture of a person in the input image from the position of the detected facial image is estimated; the positions of hands of the person is detected based on the estimated posture; the hand image of the person from the input image is extracted based on the information regarding the detected positions of the hands of the person; the shapes of the hands of the person is specified based on the extracted hand image; the specified shapes of the hands is stored in the time-series by corresponding to the information regarding the positions of the hands; and the hand gesture, which is a gesture using the hands of the person, is recognized based on the information regarding the shapes of the hands stored in the time-series by corresponding to the information regarding the positions of the hands.

The image processing apparatus according to the embodiment of the disclosure may be an independent apparatus or a block which performs image processing.

According to the embodiment of the disclosure, it is possible to recognize a hand gesture rapidly and accurately.

BRIEF DESCRIPTION OF THE DRAWINGS

FIG. 8 is a diagram illustrating the hand shape specifying process; and

DETAILED DESCRIPTION OF EMBODIMENTS

Example of Configuration of Image Processing Apparatus

Figure 1:
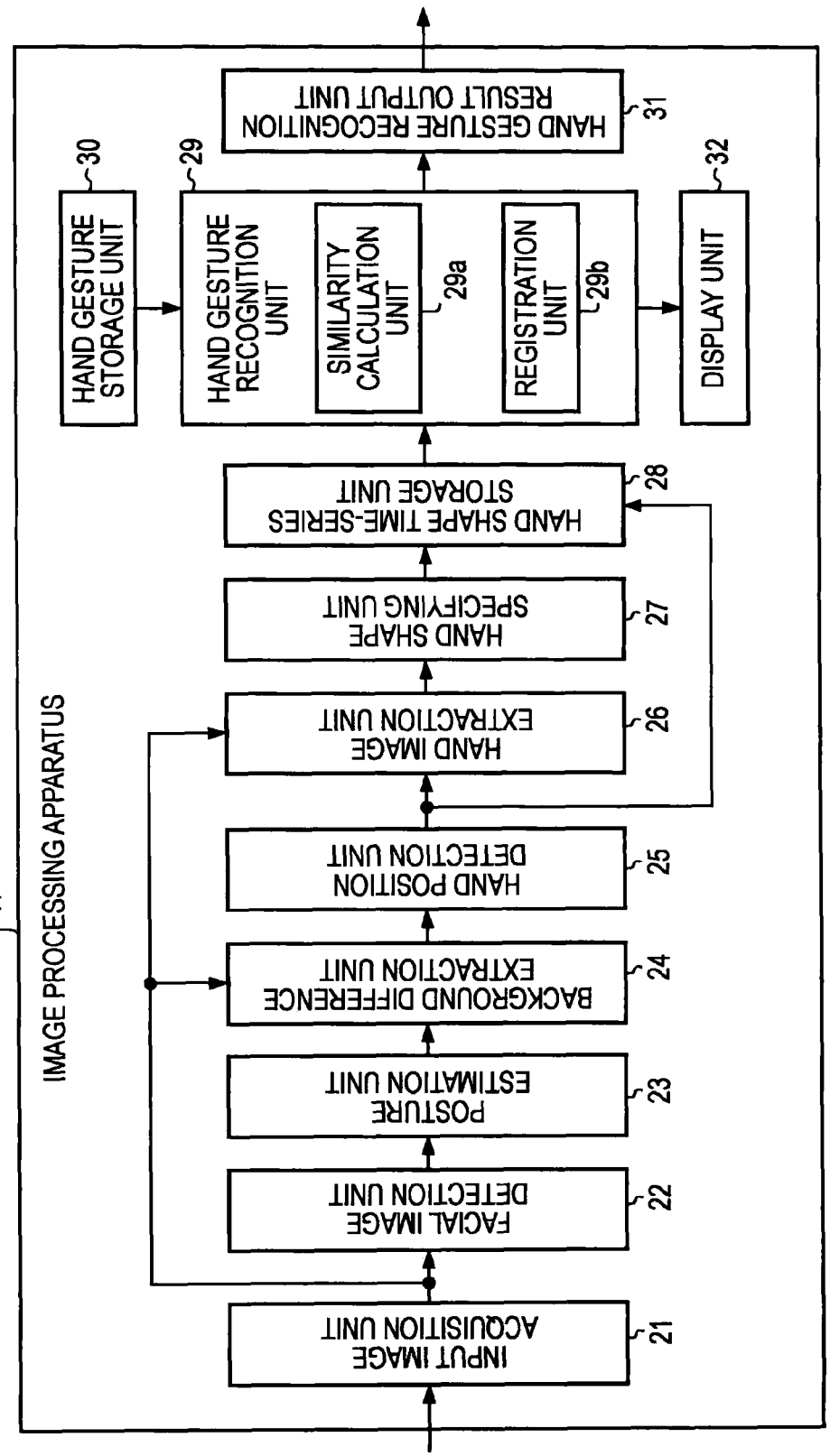
FIG. 1 is a block diagram illustrating an example of the configuration of an image processing apparatus recognizing a hand gesture according to an embodiment of the disclosure.

FIG. 1 is a diagram illustrating an example of the hardware configuration of an image processing apparatus according to an embodiment of the disclosure. An image processing apparatus 11 in FIG. 1 recognizes a hand gesture of a person, which is a subject in an input moving image, from the moving image and outputs the recognition result.

The image processing apparatus 11 includes an input image acquisition unit 21, a facial image detection unit 22, a posture estimation unit 23, a background difference extraction unit 24, a hand position detection unit 25, a hand image extraction unit 26, a hand shape specifying unit 27, and a hand shape time-series storage unit 28. The image processing apparatus 11 further includes a hand gesture recognition unit 29, a hand gesture storage unit 30, a hand gesture recognition result output unit 31, and a display unit 32.

The input image acquisition unit 21 sequentially acquires images sequentially input as moving images as images of a frame unit and supplies to the facial image detection unit 22, the background difference extraction unit 24, and the hand image extraction unit 26.

The facial image detection unit 22 detects a facial image from the images supplied in the frame unit and supplies the detected facial image and position information regarding the detected facial image to the posture estimation unit 23.

The posture estimation unit 23 estimates the posture of the human body of a person of the detected facial image from the direction, size, and position of his or her face in the facial image based on the facial image and the position information supplied from the facial image detection unit 22. More specifically, the posture estimation unit 23 specifies the position or position of the human body based on the direction or size of the face in the facial image and specifies the bases of the hands and the bases of the feet estimated from the position relationship between the human body and the face. Further, the posture estimation unit 23 specifies the range in which the arms and feet are present based on image continuity from the positions of the bases of the hands and the bases of the feet and estimates the posture of the person of the facial image based on information regarding the range in which the face, the human body, the arms, and the feet are present.

The background difference extraction unit 24 extracts only an image of the body parts of the human body, which is a foreground image, by deleting, as difference information, the facial image of the human body and the background image other than the foreground image including the human body based on the information regarding the posture of the human body estimated by the posture estimation unit 23. Then, the background difference extraction unit 24 supplies the image of the body parts of the human body to the hand position detection unit 25.

The hand position detection unit 25 detects the ranges of the hands in the image for only the body parts of the human body supplied from the background difference extraction unit 24 and detects the positions of the ranges of the hands as hand positions. The hand position detection unit 25 supplies the detected ranges and the hand positions to the hand image extraction unit 26 and the hand shape time-series storage unit 28.

The hand image extraction unit 26 extracts, as hand images, images of the ranges of the hands from the input image based on information regarding the hand positions supplied from the hand position detection unit 25 and supplies the hand images to the hand shape specifying unit 27.

The hand shape specifying unit 27 specifies the hand shapes based on the hand images and stores information regarding the specified hand shapes in the hand shape time-series storage unit 28. At this time, the hand shape time-series storage unit 28 stores the specified hand shapes by corresponding to the hand positions supplied from the hand position detection unit 25. The configuration of the hand shape specifying unit 27 will be described in detail with reference to FIG. 2.

The hand gesture recognition unit 29 reads the information regarding the hand shapes stored in the time-series by predetermined frames in the hand shape time-series storage unit 28. The hand gesture recognition unit 29 controls a similarity calculation unit 29a to calculate the similarity between each of the hand gestures, which are preliminarily registered in the hand gesture storage unit 30, and the hand shapes stored in the time-series. When the highest similarity of the hand gesture is greater than a predetermined value, the hand gesture recognition unit 29 determines that information regarding the time-series hand shapes stored in the hand shape time-series storage unit 28 is identical to the information regarding the hand shapes stored in the time-series, which corresponds to the hand gesture with the highest similarity, and then sets the corresponding hand gesture as the recognition result. Then, the hand gesture recognition unit 29 supplies the recognition result to the hand gesture recognition result output unit 31 and displays the recognition result on the display unit 32 configured by an LCD (Liquid crystal Display).

On the other hand, when the highest similarity is less than the predetermined value, the hand gesture recognition unit 29 regards the information regarding the time-series hand shapes stored in the hand shape time-series storage unit 28 as the information regarding the time-series hand shapes which are not registered in the hand gesture storage unit 30. The hand gesture recognition unit 29 allows the information regarding the unregistered time-series hand shapes to correspond to a new hand gesture and inquires whether the information is registered in the hand gesture storage unit 30 by displaying the inquiry on the display unit 32. When the hand gesture recognition unit 29 receives the new registration, the hand gesture recognition unit 29 controls a registration unit 29b to register the information regarding the unregistered time-series hand shapes as the new hand gesture in the hand gesture storage unit 30.

Example of Configuration of Hand Shape Specifying Unit

Figure 2:
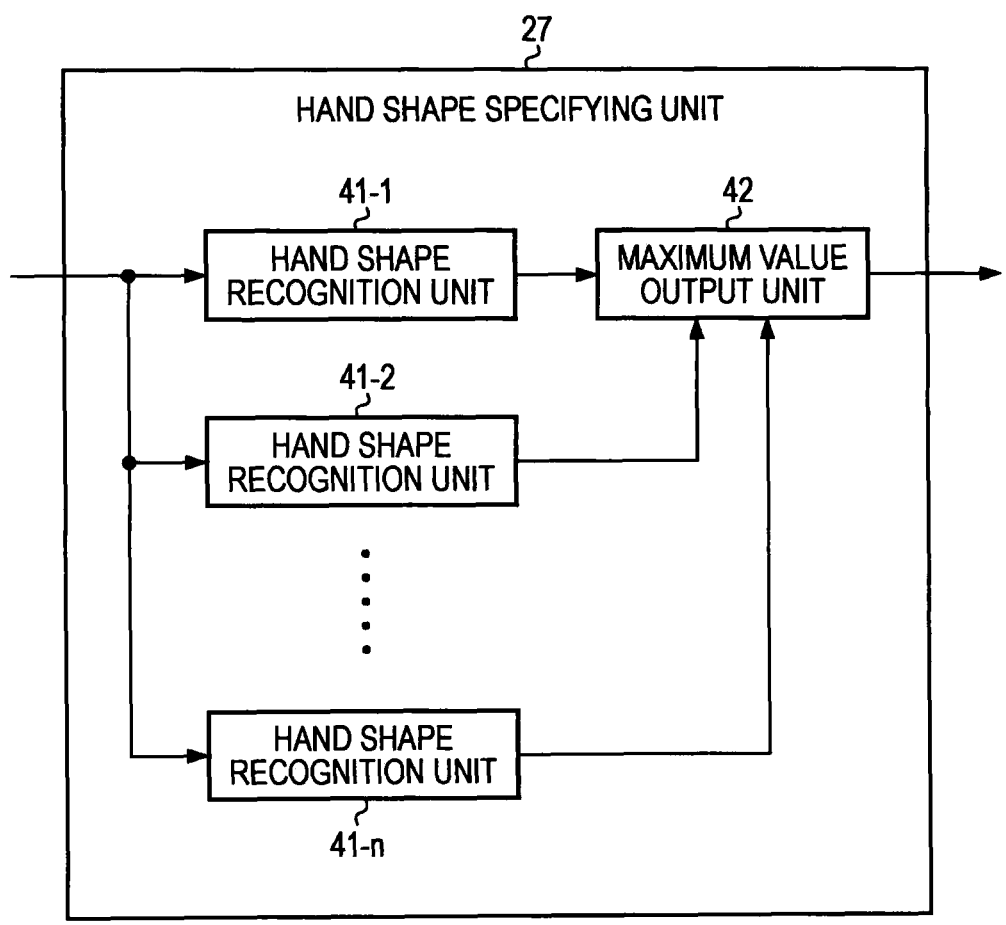
FIG. 2 is a diagram illustrating the configuration of a hand shape specifying unit in FIG. 1.

Next, an example of the configuration of the hand shape specifying unit 27 will be described with reference to FIG. 2.

The hand shape specifying unit 27 includes hand shape recognition units 41-1 to 41-$n$ and a maximum value output unit 42. Each of the hand shape recognition units 41-1 to 41-$n$ can recognize the different types of hand shapes and supplies the recognition result as a score to the maximum value output unit 42. That is, for example, the hand shape recognition units 41-1 to 41-$n$ can recognize the shapes of "rock", "scissors", and "paper" in a so-called rock-paper-scissors game or the shape of a "peace sign" and supply a recognition level as a score to the maximum value output unit 42. For example, when the hand shape recognition unit 41 recognizes the shape of "rock", the score becomes the higher value as the hand shape is more similar to the shape of "rock". On the contrary, the score becomes the lower value as the hand shape is less similar to the shape of "rock." Hereinafter, when it is not necessary to distinguish the hand shape recognition units 41-1 to 41-$n$ from each other, the hand shape recognition units 41-1 to 41-$n$ are simply referred to the hand shape recognition units 41. In other configuration, the same is applied.

The maximum value output unit 42 acquires the recognition results from the hand shape recognition units 41-1 to 41-$n$ as the scores and outputs the hand shape with the maximum value among the scores as the recognition result.

Hand Gesture Recognition Process

Figure 3:
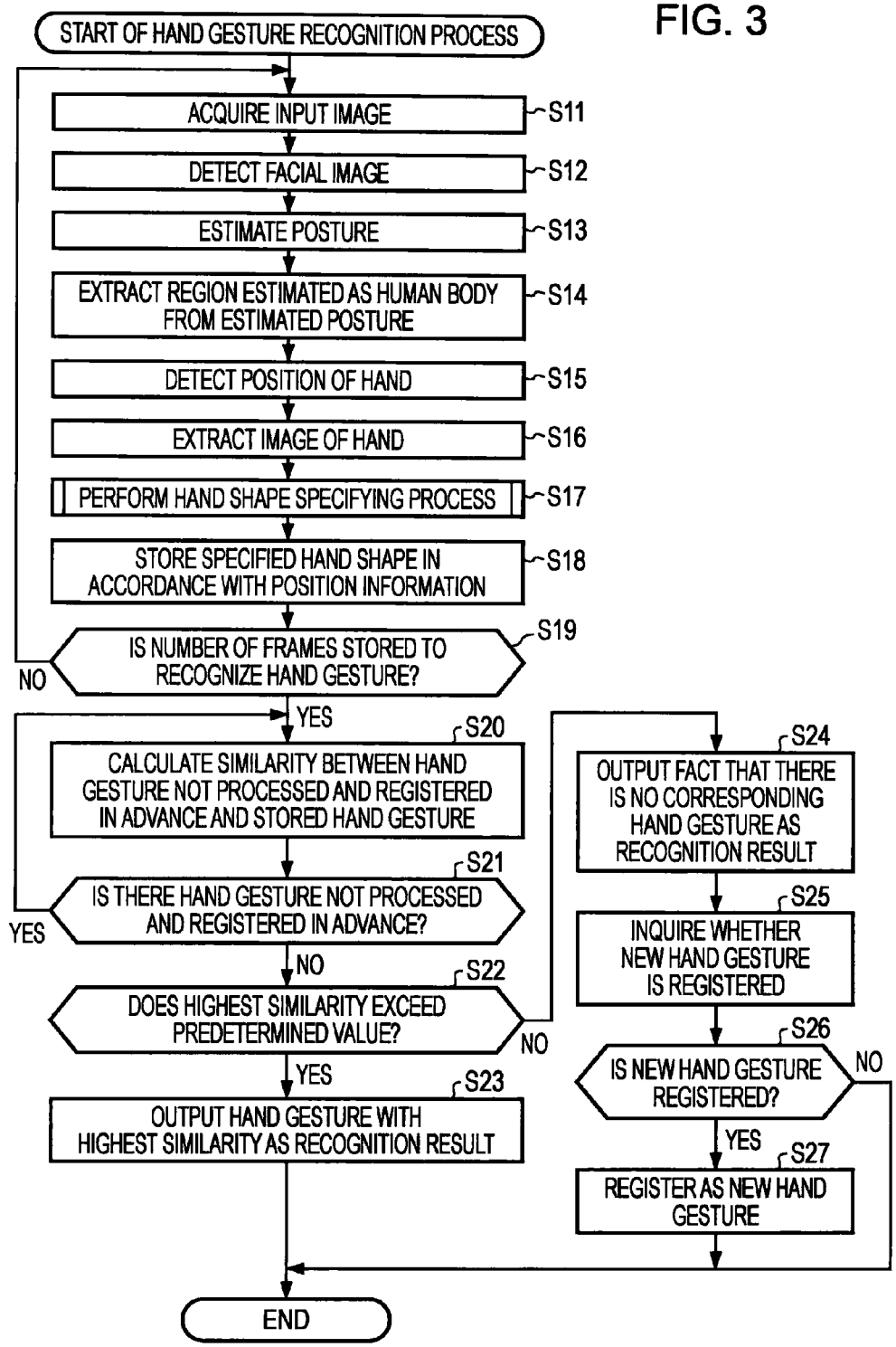
FIG. 3 is a flowchart illustrating a hand gesture recognition process.

Next, a hand shape recognition process will be described with reference to the flowchart of FIG. 3.

In step S11, the input image acquisition unit 21 acquires one frame of an input image as a moving image and supplies the image to the facial image detection unit 22, the background difference extraction unit 24, and the hand image extraction unit 26.

Figure 4:
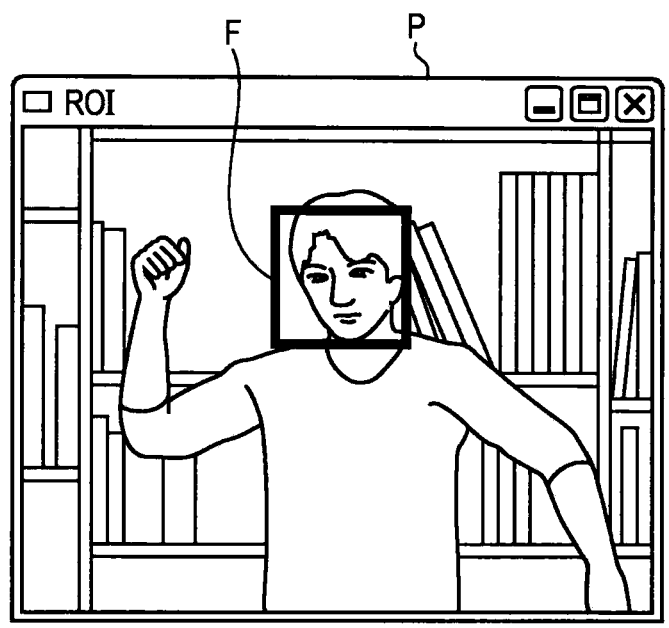
FIG. 4 is a diagram illustrating the hand gesture recognition process.

In step S12, the facial image detection unit 22 detects the facial image from the supplied image. More specifically, for example, when an image P shown in FIG. 4 is supplied, the facial image detection unit 22 supplies the rectangular facial image F and the position of the facial image F from the disposition of an image corresponding to eyes parts, a mouth part, a noise part forming the facial image as information regarding the coordinates indicating the position of the facial image F to the posture estimation unit 23. Further, the information regarding the position of the facial image includes the information regarding the position of the facial image F shown in FIG. 4 and information regarding the vertical direction of the facial image F.

In step S13, the posture estimation unit 23 estimates the posture of a person in the facial image detected from the input image based on the facial image and the information regarding the position of the facial image. More specifically, when that the facial image F and the position of the facial image F shown in FIG. 4 are obtained, the posture estimation unit 23 detects the ranges of the arms extending from the vicinity of the base of the shoulder in the specified human body, for example, based on continuity of the images of the arm parts, since the position and size of the human body are substantially specified. Then, the posture estimation unit 23 specifies the ranges of the entire arms by gradually tracking the ranges of the arms. In accordance with the same method, the posture estimation unit 23 also detects the ranges of the feet, if necessary. The posture estimation unit 23 estimates, for example, a posture indicated by a posture model P1 shown in the right side of FIG. 5, based on the facial image F shown in FIG. 4 and the information regarding the position of the facial image F shown in FIG. 5 by synthesizing the detection results of the ranges. Then, the posture estimation unit 23 supplies the estimated posture to the background difference extraction unit 24.

In step S14, the background difference extraction unit 24 extracts information regarding the entire range of the human body taking the estimated posture, which becomes a foreground image, as a background difference image by deleting the range other than the range in which the human body can exist in the image, as a background image from information regarding the posture of the human body estimated by the posture estimation unit 23. Then, background difference extraction unit 24 supplies the extracted information to the hand position detection unit 25.

Figure 5:
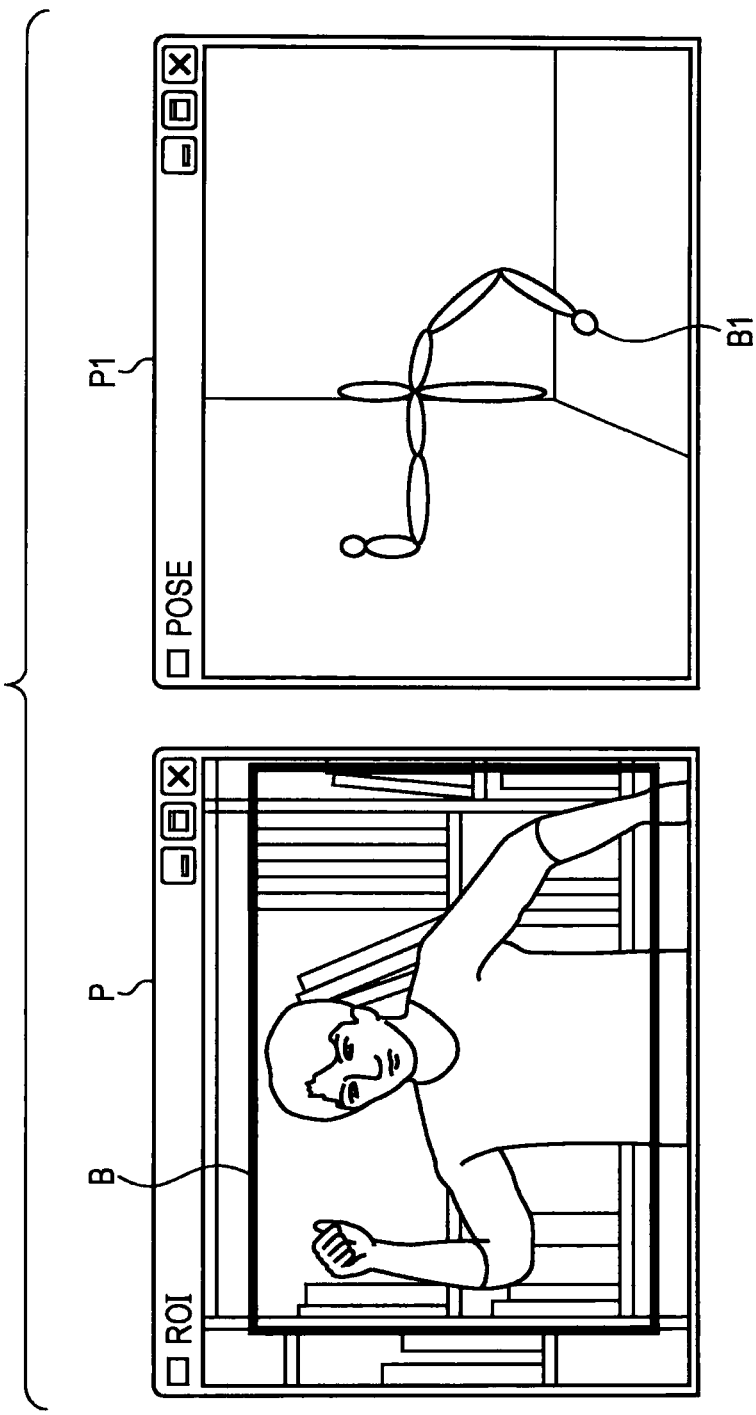
FIG. 5 is a diagram illustrating the hand gesture recognition process.
Figure 6:
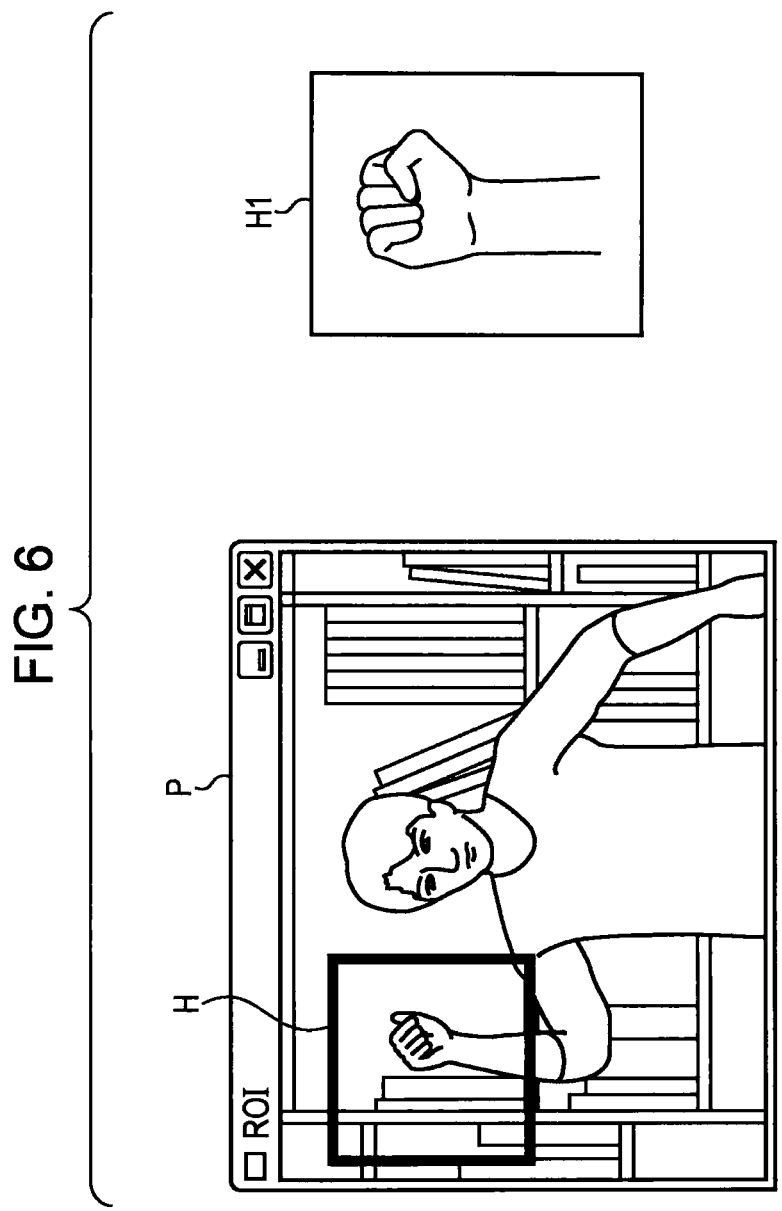
FIG. 6 is a diagram illustrating the hand gesture recognition process.

In step S15, the hand position detection unit 25 specifies the ranges, in which the hands are detected, from the image of the extracted range supplied from the background difference extraction unit 24, detects the positions of the hands within the specified ranges, and supplies the positions of the hands to the hand image extraction unit 26. That is, for example, when the posture shown in the right side of FIG. 5 is estimated, a range expressed as a range H of the left side of FIG. 6 is detected as the position at which the hand is present.

In step S16, the hand image extraction unit 26 extracts a hand image from the image supplied from the input image acquisition unit 21 based on the information regarding the position of the hand supplied from the hand position detection unit 25 and supplies the hand image to the hand shape specifying unit 27. That is, for example, when the information regarding the range H shown in the left side of FIG. 6 is given as the position of the detected hand to the hand image extraction unit 26, as shown in the right side of FIG. 6, the hand image extraction unit 26 extracts a hand image H1 in the range and supplies the hand image H1 to the hand shape specifying unit 27.

In step S17, the hand shape specifying unit 27 specifies a hand shape by executing a hand shape specifying process based on the hand image supplied from the hand image extraction unit 26.

Hand Shape Specifying Process

Figure 7:
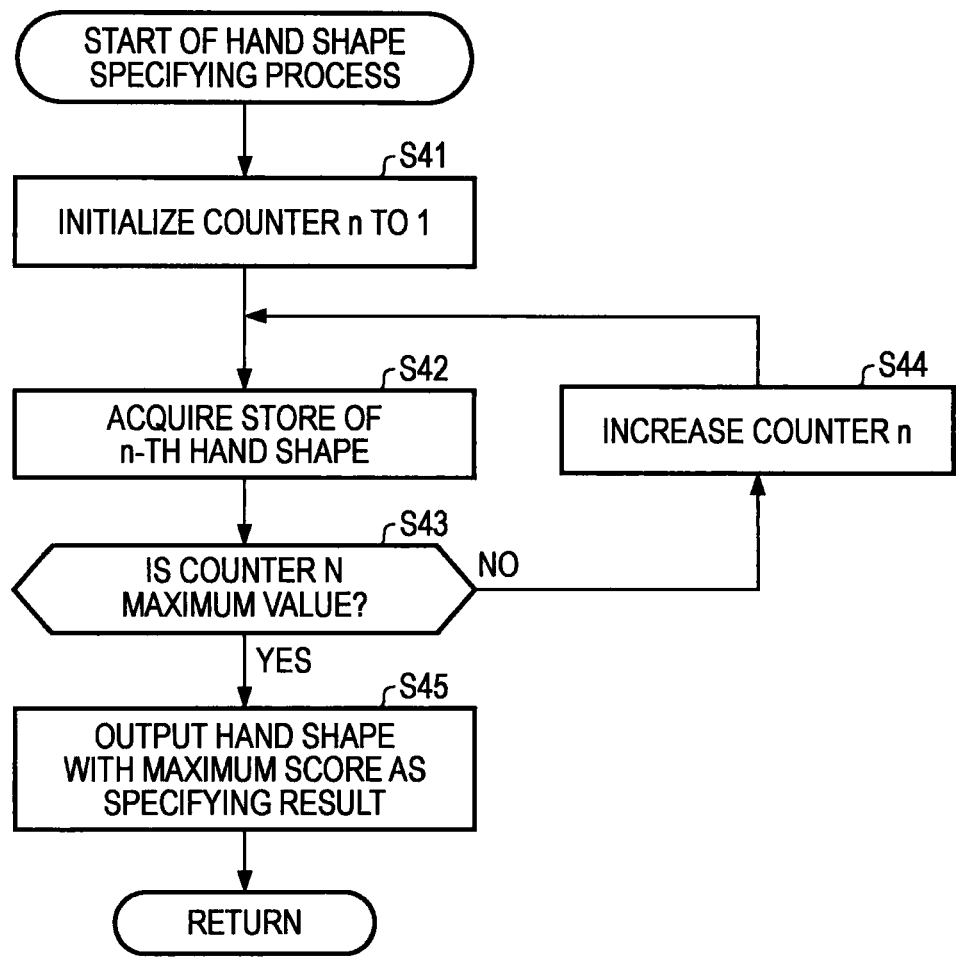
FIG. 7 is a flowchart illustrating the hand shape specifying process.

Hereinafter, the hand shape specifying process will be described with reference to the flowchart of FIG. 7.

In step S41, the maximum value output unit 42 initializes a counter n identifying the hand shape recognition unit 41-$n$ to 1.

In step S42, the maximum value output unit 42 acquires the score of the hand shape to be identified by the hand shape recognition unit 41-$n$. That is, when the hand shape recognition unit 41-$n$ recognizes the hand shape of "rock" in the so-called rock-paper-scissors game, the hand shape recognition unit 41-$n$ calculates a score indicating to what extent the recognized hand shape is similar to the "rock" and supplies the score to the maximum value output unit 42. In this way, the maximum value output unit 42 acquires and stores the score together with information identifying which hand shape recognition unit 41-$n$ calculates the score, that is, information identifying to which hand shape the score of the hand shape corresponds.

In step S43, the maximum value output unit 42 determines whether the counter n becomes the maximum value, that is, whether the scores from all of the hand shape recognition units 41-$n$ are acquired. When the counter n is not the maximum value, that is, there is the hand shape recognition unit 41-$n$ which does not acquire the score in step S43, the process proceeds to step S44.

In step S44, the maximum value output unit 42 adds the counter n by one and the process returns to step S42. That is, the processes from step S42 to step S44 are repeated until the scores are acquired from all of the hand shape recognition units 41-$n$. When it is determined that the counter n is the maximum value, that is, all of the scores are acquired from the hand shape recognition units to 41-1 to 41-$n$ in step S44, the process proceeds to step S45.

In step S45, the maximum value output unit 42 outputs the hand shape recognized by the hand shape recognition unit 41-$n$ supplying the maximum score among the scores acquired by the hand shape recognition units 41-1 to 41-$n$ as the hand shape specified from the hand image to the hand shape time-series storage unit 28.

Here, referring back to the flowchart of FIG. 3, the description will be made.

In step S18, the hand shape time-series storage unit 28 stores the specified hand shape supplied from the hand shape specifying unit 27 by corresponding to information regarding the hand position supplied from the hand position detection unit 25. At this time, when the storage capacity is full, the hand shape time-series storage unit 28 deletes information regarding the oldest hand shape and stores information regarding the new hand shape. That is, the hand shape time-series storage unit 28 stores the information regarding the hand shapes of predetermined frames immediately adjacent to each other by corresponding to the information regarding the hand position.

In step S19, the hand gesture recognition unit 29 determines whether the information regarding the hand shapes specified by corresponding to the information regarding the positions of the hands in a time-series is stored by the number of frames necessary to recognize a hand gesture. When the hand gesture recognition unit 29 determines that the information regarding the specified hand shapes is not stored by the number of frames necessary to recognize the hand gesture in step S19, the process returns to step S11.

That is, the processes from step S11 to step S19 are repeated until the information regarding the specified hand shapes is stored by the number of frames necessary to recognize the hand gesture. When the hand gesture recognition unit 29 determines that the information regarding the specified hand shapes is stored by the number of frames necessary to recognize the hand gesture in step S19, the process proceeds to step S20.

In step S20, the hand gesture recognition unit 29 controls the similarity calculation unit 29a to calculate the similarity between the information regarding the time-series hand shape of the unprocessed hand gesture among the information regarding the time-series hand shapes of the hand gesture stored in advance in the hand gesture storage unit 30 and the information regarding the time-series hand shapes stored in the hand shape time-series storage unit 28.

More specifically, for example, the similarity calculation unit 29a recognizes a hand shape and a motion as an integrated module and calculates, as a similarity, a ratio of the number of modules continuously identical among the plurality of modules continuously set as the hand gesture to the total number of modules.

That is, the hand gesture may be configured by a first module to a fourth module, as indicated by hand gestures A shown in FIG. 8. That is, the hand gesture A shown in FIG. 8 is configured, from the left side of the drawing, by the first module in which a thumb is raised and swung right and left, the second module in which the hand is spread and swung to the left in the drawing, the third module in which the hand is spread and swung right and left in the drawing, and the fourth module in which the hand is spread and swung slightly right and left in the drawing.

A hand gesture B shown in FIG. 8 is configured by a first module in which a hand shape of the back of a hand being shown is formed and its position is not changed, as indicated on the left side of the drawing and a second module in which a hand shape of the palm of the hand being shown is formed and its position is not changed, as indicated on the right side of the drawing. In this case, the two types of hand shapes are alternately repeated by repeating the first and second modules a plural number of times, and consequently, a hand gesture of moving the palm of the hand in a vertical direction is configured.

A hand gesture C shown in FIG. 8 is configured by one of the modules, that is, is configured, from the left side of the drawing, by a module in which a hand shape of the thumb being raised is formed and its position is not changed, a module in which a hand shape of the index finger being raised is formed and its position is not changed, a module in which a hand shape of a peace sign is formed and its position is not changed, a module in which a hand shape of the paper in the rock-paper-scissors game is formed and its position is not changed, a module in which a hand shape of the rock in the rock-paper-scissors game is formed and its position is not changed, or the like.

As for a hand gesture D shown in FIG. 8, a hand gesture on the left side is a hand gesture configured, from the left side of the drawing, by a first module in which a hand shape of the rock in the rock-paper-scissors game is formed and its position is not changed and a second module in which a hand shape of the paper shown in the right side of the drawing is formed and the paper is shown and waves a small amount right and left. A hand gesture on the right side is a hand gesture configured by a first module in which a hand shape of the rock in the rock-paper-scissors game is formed and its position is not changed and a second module in which a hand shape of the index finger being raised, as shown in the right side in the drawing, is formed and its position is not changed.

In this way, the hand gesture is set individually based on the order of the modules set by a single or a plurality of hand shapes and a change in the position of the hand shape. At this time, the motion of a finger is recognized based on hand position information.

For example, when a first hand gesture is configured by three modules of the modules A, B, and C in a time-series and a second hand gesture is configured by modules B, C, D, and E in a time-series, the similarity calculation unit 29a searches the number of modules identical continuously in order. That is, in the first hand gesture and the second hand gesture, the vicinity of the modules B and C is identically configured. Thus, for example, the similarity calculation unit 29a calculates the similarity of the first hand gesture with respect to the second hand gesture to 2/4 (=the number of modules identical in order/the total number of modules of the second hand gesture). Further, the similarity described here is merely an example. Other similarities may be defined and the similarities may be calculated. For example, when the HMM (Hidden Markov Model) is used, the similarity may be calculated by series estimation (see IEEE TRANSACTIONS ON PATTERN ANALYSIS AND MACHINE INTELLIGENCE, VOL. 21, No. 10 Oct. 1999, An HMM-Based Threshold Model Approach for Gesture Recognition Hyeon-Kyu Lee and Jin H. Kim).

In step S21, the hand gesture recognition unit 29 determines whether there is unprocessed information among the information regarding the time-series hand shapes for each hand gesture stored in the hand gesture storage unit 30. When gesture recognition unit 29 determines that there is the unprocessed information, the process returns to step S20. That is, the similarity is calculated between the information regarding the time-series hand shapes for every hand gesture stored in advance in the hand gesture storage unit 30 and the information regarding the time-series hand shapes stored in the hand shape time-series storage unit 28.

When gesture recognition unit 29 determines that there is no unprocessed information among the information regarding the time-series hand shapes, which are stored in the hand gesture storage unit 30, for each hand gesture in step S21, the process proceeds to step S22.

In step S22, the hand gesture recognition unit 29 determines whether the highest similarity is greater than a predetermined threshold value. That is, when the highest similarity between the information regarding the time-series hand shapes registered in the hand gesture storage unit 30 and the information regarding the time-series hand shapes stored in the hand shape time-series storage unit 28 is less than the predetermined threshold value, the corresponding hand gesture is not considered in spite of the highest similarity. On the other hand, when the highest similarity is greater than the predetermined threshold value in step S22, the hand gesture with the highest similarity is considered to be the recognition result. Then, the process proceeds to step S23.

In step S23, the hand gesture recognition unit 29 considers the information regarding the time-series hand shapes of the hand gesture with the highest similarity to be identical to the information regarding the time-series hand shapes stored in the hand shape time-series storage unit 28. The hand gesture recognition unit 29 supplies the hand gesture with the highest similarity as the recognition result to the hand gesture recognition result output unit 31. The hand gesture recognition result output unit 31 outputs the supplied information regarding the hand gesture as the recognition result. At this time, the hand gesture recognition unit 29 controls the display unit 32 to displays the information regarding the hand gesture as the recognition result.

On the other hand, in step S22, when the highest similarity is less than the predetermined threshold value and there is no hand gesture identical to the information regarding the time-series hand shapes stored in the hand shape time-series storage unit 28, the process proceeds to step S24.

In step S24, the hand gesture recognition unit 29 controls the display unit 32 to display the fact that there is no corresponding hand gesture.

In step S25, the hand gesture recognition unit 29 controls the display unit 32 to display a screen on which a message is displayed to inquire whether the information regarding the hand shapes, which is stored in the hand shape time-series storage unit 28 and for which there is no corresponding hand gesture, is registered as new hand gesture.

In step S26, the hand gesture recognition unit 29 determines whether an instruction to register a new hand gesture is given through an operation of an operation unit (not shown). For example, when the instruction to register the new gesture is given, the process proceeds to step S27.

In step S27, the hand gesture recognition unit 29 controls the registration unit 29*b* to register the information regarding the time-series hand shapes stored in the hand shape time-series storage unit 28 as the new gesture in the hand gesture storage unit 30. Then, the process ends.

When the instruction to register the new hand gesture is not given in step S26, the process of step S27 is skipped and the hand gesture recognition process ends.

In this way, the hand gesture is recognized based on the information regarding the time-series hand shapes, the position of the facial image is specified from the image, the posture of the human body is estimated from the facial image, the hand position is detected from the estimated posture information, the hand image is extracted based on the detected hand position, the hand shapes are specified based on the hand image, and the hand gesture is recognized as the information regarding the time-series hand shapes. As a consequence, the hand shapes can be specified, the hand position can be calculated from the image, the hand image can be extracted, and the hand shapes can be specified from the hand image. Therefore, since the hand image can be acquired rapidly and highly precisely, the hand gesture can be estimated more accurately based on the acquired hand shapes.

Further, the information regarding the time-series hand shapes unrecognized as a hand gesture can be registered as the information regarding the time-series hand shapes of the new hand gesture, if necessary. Therefore, various types of hand gestures can be recognized accurately.

According to the embodiment of the disclosure, the hand gesture can be recognized rapidly and accurately using an image including the entire human body.

The above-described series of processes may be executed by hardware or software. When the series of processes are executed by software, a program for the software is installed, from a recording medium, in a computer embedded with dedicated hardware or a computer, such as general personal computer which can execute various functions by installing various programs.

Figure 9:
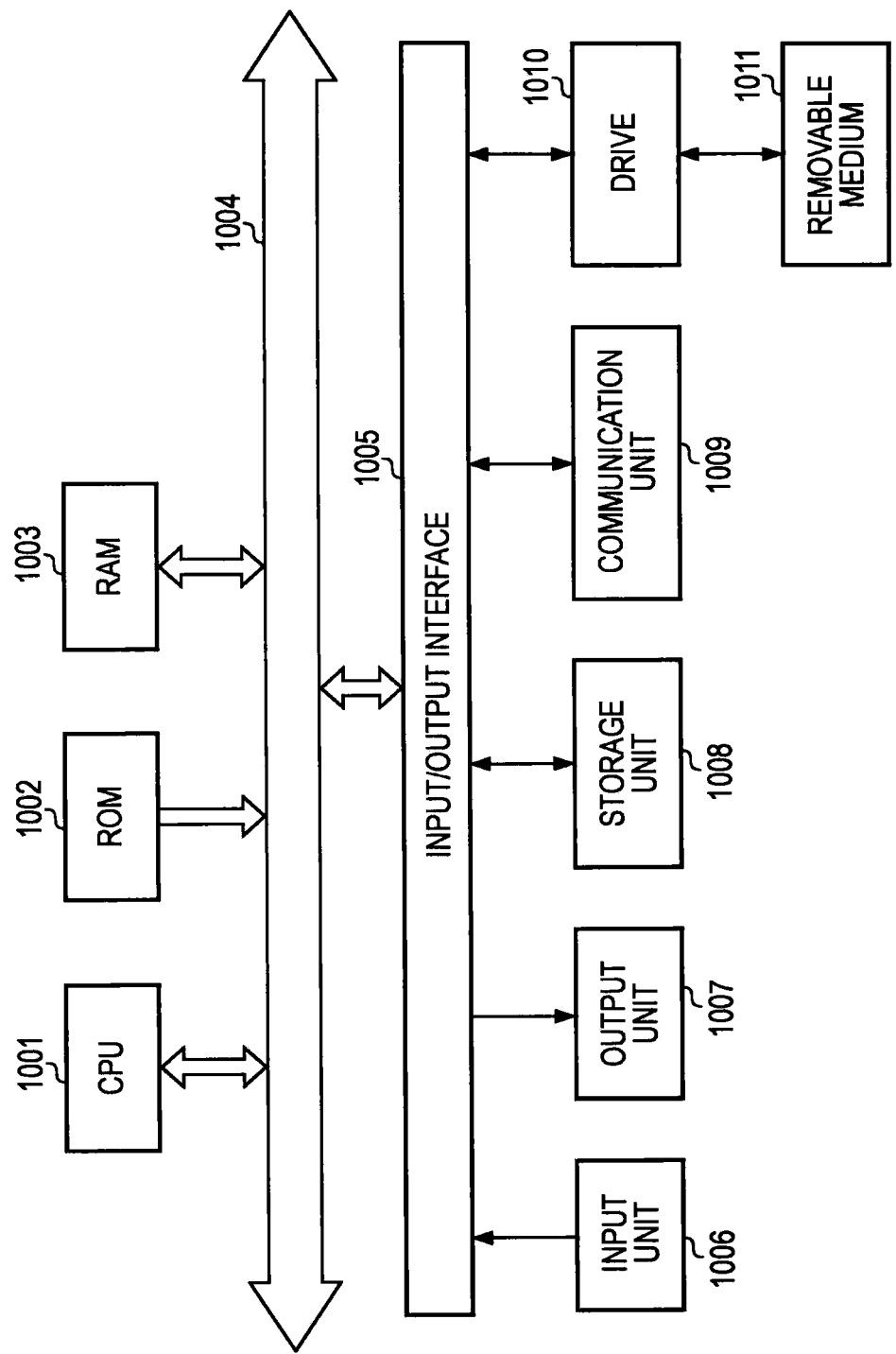
FIG. 9 is a diagram illustrating an example of the configuration of a general personal computer.

FIG. 9 is a diagram illustrating an example of the configuration of a general personal computer. The personal computer has a CPU (Central Processing Unit) 1001 therein. An input/output interface 1005 is connected to the CPU 1001 via a bus 1004. A ROM (Read Only Memory) 1002 and a RAM (Random Access Memory) 1003 are connected to the bus 1004.

An input unit 1006 which is configured by an input device such as a keyboard or a mouse used for a user to input an operation command, an output unit 1007 which outputs a processing operation screen or a processing result image to a display device, a storage unit 1008 which is configured by a hard disk drive storing programs or various kinds of data, and a communication unit 1009 which is configured by a LAN (Local Area Network) adapter and executes a communication process via a network such as the Internet are connected to the input/output interface 1005. A drive 1010 capable of reading and writing data is connected to a removable medium 1011 such as a magnetic disk (including a flexible disk), an optical disc (including a CD-ROM (Compact Disc-Read Only Memory) and a DVD (Digital Versatile Disc)), a magneto-optical disc (including an MD (Mini Disc)), or a semiconductor memory.

The CPU 1001 execute various kinds of processes in accordance with a program stored in the ROM 1002 or a program read from the removable medium 1011 such as a magnetic disk, an optical disc, or a semiconductor memory, installed in the storage unit 1008, and loaded on the RAM 1003 from the storage unit 1008. The RAM 1003 appropriately stores data necessary for the CPU 1001 to execute various kinds of processes.

In the specification, steps describing the program stored in the recording medium include processes chronologically performed in the described order and, of course, include processes not chronologically performed but performed in parallel or individually.

The present disclosure contains subject matter related to that disclosed in Japanese Priority Patent Application JP 2010-247284 filed in the Japan Patent Office on Nov. 4, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a facial image detection unit which detects a facial image from an input image;
   a posture estimation unit which estimates a posture of a person in the input image from a position of the facial image detected by the facial image detection unit;
   a hand position detection unit which detects positions of hands of the person based on the posture estimated by the posture estimation unit;
   a hand image extraction unit which extracts a hand image of the person from the input image based on information regarding the positions of the hands of the person detected by the hand position detection unit;
   a hand shape specifying unit which specifies shapes of the hands of the person based on the hand image extracted by the hand image extraction unit;
   a hand shape time-series storage unit which stores the shapes of the hands specified by the hand shape specifying unit in a time-series by corresponding to the information regarding the positions of the hands;
   a hand gesture recognition unit which recognizes a hand gesture, which is a gesture using the hands of the person, based on information regarding the shapes of the hands stored in the time-series in the hand shape time-series storage unit by corresponding to the information regarding the positions of the hands;

a hand gesture storage unit which stores information regarding the shapes of the hands in a time-series by corresponding to information regarding the positions of the hands for each type of hand gesture; and a similarity calculation unit which calculates similarity between the information regarding the shapes of the hands stored in the time-series in the hand shape time-series storage unit by corresponding to the information regarding the positions of the hands and the information regarding the shapes of the hands stored in the time-series in the hand gesture storage unit by corresponding to the information regarding the positions of the hands for each hand gesture, wherein the hand gesture recognition unit compares the information regarding the shapes of the hands stored in the time-series in the hand shape time-series storage unit by corresponding to the information regarding the positions of the hands to the information regarding the shapes of the hands stored in the time-series in the hand gesture storage unit by corresponding to the information regarding the positions of the hands for each hand gesture, and then recognizes the hand gesture based on the comparison result, wherein the similarity calculation unit recognizes a hand shape and a motion as an integrated module, and calculates, as the similarity, a ratio of a number of modules that are continuously identical among a plurality of modules continuously set as the hand gesture, to a total number of modules set for the hand gesture, and wherein the hand gesture recognition unit sets the hand gesture with the highest similarity as a recognition result, wherein the facial image detection unit, the posture estimation unit, the hand position detection unit, the hand image extraction unit, the hand shape specifying unit, the hand shape time-series storage unit, the hand gesture recognition unit, the hand gesture storage unit and the similarity calculation unit are each implemented via at least one processor.

2. The image processing apparatus according to claim 1, wherein the hand gesture recognition unit does not recognize the hand gesture, when the highest similarity is less than a predetermined threshold value.

3. The image processing apparatus according to claim 1, further comprising:

a registration unit which registers the information regarding the shapes of the hands stored in the time-series in the hand shape time-series storage unit by corresponding the information regarding the positions of the hands to a new hand gesture when the highest similarity is less than a predetermined threshold value, wherein the registration unit is implemented via at least one processor.

4. The image processing apparatus of claim 1, wherein the posture estimation unit estimates the posture of a person in the input image from a position of the facial image detected in order to minimize the amount of image processing effort of the at least one processor.

5. The image processing apparatus of claim 4, wherein the posture estimation unit estimates the posture of a person in the input image from a position of the facial image detected in order to minimize the amount of image processing effort in the hand position detection unit.

6. The image processing apparatus of claim 5, wherein the posture estimation unit estimates the posture of a person in the input image from a position of the facial image detected in order to minimize the amount of image processing effort in the hand position detection unit and the hand image extraction unit.

7. The image processing apparatus of claim 4, wherein:

by minimizing the amount of image processing effort of the at least one processor multiple frames of a moving picture can be processed in substantially real time to recognize the hand gesture shown in the moving picture; and each of the multiple frames of the moving picture is processed separately as the input image.

8. The image processing apparatus of claim 1, wherein the posture estimation unit estimates the posture of the human body of the facial image from direction, size and position of a face in the facial image.

9. The image processing apparatus of claim 1, wherein the posture estimation unit specifies position of human body based on direction or size of a face in the facial image and specifies bases of hands and bases of feet estimated from a position relationship between the human body and the face.

10. The image processing apparatus of claim 1, wherein when the hand shape time-series storage unit is full, information regarding oldest hand shape is deleted and information regarding new hand shape is stored.

11. The image processing apparatus of claim 1, wherein the hand gesture is set individually based on an order of the modules set by a single or a plurality of hand shapes and a change in the position of the hand shape.

12. The image processing apparatus of claim 1, further comprising:

a hand gesture registration unit which registers the hand gesture as a new hand gesture if the hand gesture recognition unit does not recognize the hand gesture using at least one processor, wherein:

the image processing apparatus notifies the person that the hand gesture recognition unit does not recognize the hand gesture, and the image processing apparatus inquires to the person if the new hand gesture is to be registered before the hand gesture registration unit registers the new hand gesture.

13. The image processing apparatus according to claim 1, wherein the facial image detection unit supplies a rectangular facial image and a position of the facial image from a disposition of an image corresponding to eyes parts, a mouth part, and a nose part forming the facial image as information regarding a coordinate indicating the position of the facial image of the inputted image, and wherein the information regarding the coordinate indicating the position of the facial image includes a facing orientation of the rectangular facial image.

14. The image processing apparatus of claim 13, wherein the facing orientation is relative to a vertical direction.

15. The image processing apparatus according to claim 1, wherein the hand gesture recognition unit is further configured to determine whether the information regarding the shapes of the hands corresponding to the information regarding the positions of the hands in a time-series is stored by a predetermined number of frames necessary to recognize a hand gesture.

16. The image processing apparatus according to claim 15, wherein, the hand gesture recognition unit is further to configured to calculate the similarity when the information regarding the shapes of the hands corresponding to the information regarding the positions of the hands in a time-series is determined to be stored by the predetermined number of frames necessary to recognize the hand gesture.

17. An image processing method being executed via at least one processor, and comprising:
  detecting a facial image from an input image;
  estimating a posture of a person in the input image from a position of the facial image detected in the detecting of the facial image;
  detecting positions of hands of the person based on the posture estimated in the estimating of the posture of the person;
  extracting a hand image of the person from the input image based on information regarding the positions of the hands of the person detected in the detecting of the hand positions of the hands;
  specifying shapes of the hands of the person based on the hand image extracted in the extracting of the hand image;
  storing, into a hand shape time-series storage unit, the shapes of the hands specified in the specifying of the shapes of the hands in the time-series by corresponding to the information regarding the positions of the hands;
  recognizing a hand gesture, which is a gesture using the hands of the person, based on the information regarding the shapes of the hands stored in the time-series in the storing of the shapes of the hands by corresponding to the information regarding the positions of the hands;
  storing, into a hand gesture storage unit, information regarding the shapes of the hands in a time-series by corresponding to information regarding the positions of the hands for each type of hand gesture;
recognizing a hand shape and a motion as an integrated module;
  calculating a similarity between the information regarding the shapes of the hands stored in the time-series by corresponding to the information regarding the positions of the hands and the information regarding the shapes of the hands stored in the time-series by corresponding to the information regarding the positions of the hands for each hand gesture, and
  calculating, as the similarity, a ratio of a number of modules that are continuously identical among a plurality of modules continuously set as the hand gesture, to a total number of modules set for the hand gesture,
  wherein the information regarding the shapes of the hands stored in the time-series in the hand shape time-series storage unit by corresponding to the information regarding the positions of the hands is compared to the information regarding the shapes of the hands stored in the time-series by corresponding to the information regarding the positions of the hands for each hand gesture, and the hand gesture is then recognized based on a result of the comparison, and sets the hand gesture with the highest similarity as a recognition result.

18. A non-transitory computer-readable medium having embodied thereon a program, which when executed by a processor of a computer, causes the computer to execute a method, the method comprising:
  detecting a facial image from an input image,
  estimating a posture of a person in the input image from a position of the facial image detected in the detecting of the facial image,
  detecting positions of hands of the person based on the posture estimated in the estimating of the posture of the person,
  extracting a hand image of the person from the input image based on information regarding the positions of the hands of the person detected in the detecting of the hand positions of the hands,
  specifying shapes of the hands of the person based on the hand image extracted in the extracting of the hand image,
  storing, into a hand shape time-series storage unit, the shapes of the hands specified in the specifying of the shapes of the hands in a time-series by corresponding to the information regarding the positions of the hands,
  recognizing a hand gesture, which is a gesture using the hands of the person, based on the information regarding the shapes of the hands stored in the time-series in the storing of the shapes of the hands by corresponding to the information regarding the positions of the hands,
  storing, into a hand gesture storage unit, information regarding the shapes of the hands in a time-series by corresponding to information regarding the positions of the hands for each type of hand gesture,
  recognizing a hand shape and a motion as an integrated module,
  calculating a similarity between the information regarding the shapes of the hands stored in the time-series by corresponding to the information regarding the positions of the hands and the information regarding the shapes of the hands stored in the time-series by corresponding to the information regarding the positions of the hands for each hand gesture, and
  calculating, as the similarity, a ratio of a number of modules that are continuously identical among a plurality of modules continuously set as the hand gesture, to a total number of modules set for the hand gesture,
  wherein the information regarding the shapes of the hands stored in the time-series in the hand shape time-series storage unit by corresponding to the information regarding the positions of the hands is compared to the information regarding the shapes of the hands stored in the time-series in the hand gesture storage unit by corresponding to the information regarding the positions of the hands for each hand gesture, and the hand gesture is then recognized based on a result of the comparison, and
  wherein the hand gesture recognition unit sets the hand gesture with the highest similarity as a recognition result.

* * * * *